United States Patent [19]
Palmer

[11] Patent Number: 5,255,710
[45] Date of Patent: Oct. 26, 1993

[54] PROCESS-CHAMBER FLOW CONTROL SYSTEM

[76] Inventor: David Palmer, 200 Berkeley Rd., North Andover, Mass. 02174

[21] Appl. No.: 851,017

[22] Filed: Mar. 13, 1992

Related U.S. Application Data

[63] Continuation-in-part of Ser. No. 669,746, Mar. 15, 1991, abandoned, which is a continuation-in-part of Ser. No. 405,835, Sep. 11, 1989, Pat. No. 5,000,221, which is a continuation-in-part of Ser. No. 178,505, Apr. 7, 1988, abandoned.

[51] Int. Cl.$^5$ .............................................. G05D 7/01
[52] U.S. Cl. ...................................... 137/501; 137/599
[58] Field of Search ............... 137/500, 501, 502, 503, 137/487.5, 505, 38, 504, 579

[56] References Cited

U.S. PATENT DOCUMENTS

| | | | |
|---|---|---|---|
| 3,995,656 | 12/1976 | Mills, Jr. ........................ | 137/497 |
| 4,250,914 | 2/1981 | Ferrentino ..................... | 137/501 |
| 4,431,020 | 2/1984 | Kowalski ....................... | 137/110 |
| 4,508,140 | 4/1985 | Harrison ........................ | 137/501 |
| 4,791,957 | 12/1988 | Ross ............................ | 137/505.12 |
| 4,796,660 | 1/1989 | Bron ............................ | 137/504 |

FOREIGN PATENT DOCUMENTS

| | | |
|---|---|---|
| 275361 | 7/1988 | European Pat. Off. . |
| 1429932 | 3/1976 | United Kingdom . |

Primary Examiner—Stephen M. Hepperle
Attorney, Agent, or Firm—Bromberg & Sunstein

[57] ABSTRACT

To control the flow of air into and/or out of a process chamber, such as a clean room, a two-stage system is disposed in conduits leading into and/or out of the process-chamber. One stage includes a regulator, which has a plenum disposed between the environment and the air source or the vacuum source. The regulator maintains in the plenum a pressure that is between the pressures of the environment and the source and that is a constant amount different from the environment's pressure. The regulator includes a piston having a frontal face exposed to air in the plenum flowing between the environment and the source, and a distal face exposed to the environment's pressure. In some embodiments, a gate is attached to the piston. Either the gate or the piston is mounted so as to variably impede the flow of air through the regulator and so that the weight of the piston tends to move the piston in a direction so as to lessen the impedance on the air flow. The other stage includes an adjustable valve, located between the regulator and the environment, for further impeding the flow of air.

5 Claims, 5 Drawing Sheets

PROCESS-CHAMBER FLOW CONTROL SYSTEM

DESCRIPTION

This application is a continuation-in-part of application Ser. No. 07/669,746,filed Mar. 15, 1991 now abandoned, which is a continuation-in-part of application Ser. No. 07/405,835 (the "Grandparent Application"), filed Sep. 11, 1989 and issued Mar. 19, 1991 as U.S. Pat. No. 5,000,221, which is a continuation-in-part of application Ser. No. 07/178,505, filed Apr. 7, 1988, now abandoned. Filed concurrently herewith are applications for Flow Regulator Adaptable For Use With Exhaust From A Process Chamber, Flow Regulator Adaptable For Use With Process-Chamber Air Filter and Flow Control Valve With Venturi by the same inventor as the present, invention and bearing Ser. Nos. 850,767 852,084 and 851,016 respectively. All these applications are hereby incorporated herein by reference.

TECHNICAL FIELD

This invention generally relates to a system for regulating the flow of a fluid, in particular a gas, into and out of a process chamber.

BACKGROUND ART

In a heating, ventilating, and air conditioning (HVAC) system, air flow is typically controlled using resistors to slow down the flow of air at different points to obtain the proper air balance throughout a building. These resistors may be comprised of gate valves, butterfly valves or dampers, and may be fixed, adjustable or motorized. When one resistor is adjusted, the pressure level throughout the HVAC system will change; any change in the HVAC system pressure will affect the flow of air past every other resistor. Thus, adjusting a resistor at the output causes "cross-talk." Previous attempts to solve the problem of air flow control have automated the resistors using micro-processors and servo-motors.

Municipal gas companies in the United States distribute gas through a network that is terminated with pressure regulators. In these gas distribution systems the pressure at the point of use is fairly independent of pressure changes throughout the distribution network. This can be accomplished because the distribution network is designed to withstand large pressures, and a large pressure drop can be caused at the point of use.

The approach, taken by gas companies, of providing a pressure regulator at the point of use has not been practical for the HVAC industry, because the HVAC industry moves very large quantities of air at very low pressure, and because the HVAC industry is usually more interested in controlling mass flow, not pressure. The comfort of the environment is determined by the thermal mass of hot and cold air that is moved.

Safety valves used in the gas industry, and in other fields involving the handling of fluids under high pressure, open or close only in extreme situations where a large rise or drop in pressure poses a danger. (Gas companies have safety valves that shut off the flow of gas when there is a large decrease in pressure, since such a decrease may be due to a leak downstream of the valve. Many safety valves vent fluid from a conduit when there is a large increase in pressure in order to prevent the pressure in the conduit from increasing beyond the bursting point of the conduit, or beyond the capability of machinery connected to the conduit.) Other valves such as those used in gasoline pumps, also shut off flow automatically when the back-pressure increases to a certain point, indicating that the tank being filled is full. These safety valves and gasoline-pump valves are designed to be either fully opened or fully closed, and are not designed to precisely regulate the fluid flow.

One of the most complex problems confronted by the HVAC industry is controlling process chambers, such as the clean rooms used in semiconductor integrated-circuit chip manufacturing, or the medical and biotechnology laboratories kept at below atmospheric pressure to prevent potentially dangerous microbes from blowing out of the laboratories.

Clean room requirements dictate that the environment be kept at a constant temperature and humidity (typically within a few degrees and a few percent), that the mass flow into the environment be kept constant, and that the flow be distributed evenly across a ceiling. Clean room ceilings are constructed with special filters designed to remove very small particles from the air entering the room. In addition to being clean, the air leaving the filter should be at an exact velocity. The ceilings are designed to disperse the air into the clean room at the same velocity over the entire surface of the ceiling. The ceilings and filters are constructed to add as little resistance to the air flow as possible, and so that there is only little variation from one filter to the next.

In order to deliver the same mass flow to each filter, the HVAC industry uses a network of resistors deployed throughout the air delivery system. The air flow through each filter is controlled by adding or removing resistance. In a single clean room the ceiling may contain as many as 150 filters. A process called balancing is used to adjust the filter flow rates. The resistors are repeatedly adjusted in sequence, until the flow rate is within the specified range, or until the amount of time the clean room is down, during the balancing process, gets too expensive. After the balancing is completed, the whole network is still subject to changes in the supply pressure and the demand requirements of the clean room.

Air is drawn out of a clean room in two ways: some of the air exits the room through process equipment and other work stations with fume hoods, and some air exits directly through vents. It is frequently important that a constant flow rate or a constant oartial vacuum be maintained in the process equipment in order to minimize defects in the integrated circuit chips being manufactured and in order to ensure that noxious fumes do not leak from the process equipment or fume hoods and thereby endanger personnel working nearby. Air flowing from the process equipment can be treated at a central location and then can be exhausted to the outside. Air that flows through the clean room, but does not flow through the process equipment may be recycled through the clean room. Clean rooms are typically kept at a pressure slightly above atmospheric pressure, so that dust does not enter the clean room when the doors to the clean room are opened.

With regard to safety, medical and biotechnology laboratories have similar problems similar to those of integrated chip manufacturing areas. Improper vacuums or flow rates in fume hoods can expose personnel to dangerous microbes. Likewise, air flowing from fume hoods can be treated at a central location before being exhausted to the outside. These laboratories are frequently kept at a pressure slightly below atmospheric pressure, so that microbes do not accidentally blow out of the laboratories when the laboratory doors are opened.

DISCLOSURE OF INVENTION

The system that is the subject of the present invention, controls air flow from a source through an environment, such as a process chamber, to an exhaust. Of course, in order to create this flow, the source must have a higher pressure than the environment and the exhaust must have a lower pressure than the environment. Typically, the pressures of the source of air to the process chamber and of the exhaust from the process chamber vary more rapidly and by greater amounts than the pressure of air in the process chamber. In the system, conduits leading to and from the environment have two stages of regulation: (i) a regulation stage that maintains in a plenum a pressure that is a constant amount above or below the pressure of the environment, and (ii) an adjustable valve stage that creates a significant pressure drop between the plenum and the environment. The regulation stage has a plenum disposed between the environment and the pressure source, which may be either a source of air at a pressure higher than that of the environment, or an exhaust, which provides a partial vacuum to the environment. The pressure of the plenum is between the pressures of the environment and the pressure source. The regulation stage includes a piston having a frontal face exposed to fluid in the plenum flowing between the environment and the pressure source and having a distal face exposed to the environment's pressure. The piston is mounted so as to variably impede the flow of air through the regulator and so that the weight of the piston tends to move the piston in a direction so as to lessen the piston's impedance on the air flow. These two stages are placed in conduits flowing to and from the environment. It is preferable that these two stages are placed in several parallel conduits that all flow into the environment from a source, or that all flow from the environment to an exhaust.

In a device that regulates flow from an environment to an exhaust, the piston has an aperture disposed therein, through which fluid flows. A deflector, fixedly mounted adjacent to the aperture, may be used for directing the fluid flowing through the aperture radially across the frontal face of the piston. This device may regulate the flow of fluid from an environment to a vacuum source. In such a device, an increase in pressure on the distal face of the piston tends to increase the piston's impedance on the fluid flow, and an increase in pressure on the frontal face of the piston tends to lessen the piston's impedance on the fluid flow. The restoring force is exerted on the piston so as to tend to lessen the impedance on the fluid flow.

DESCRIPTION OF SPECIFIC EMBODIMENTS

Figure 1:
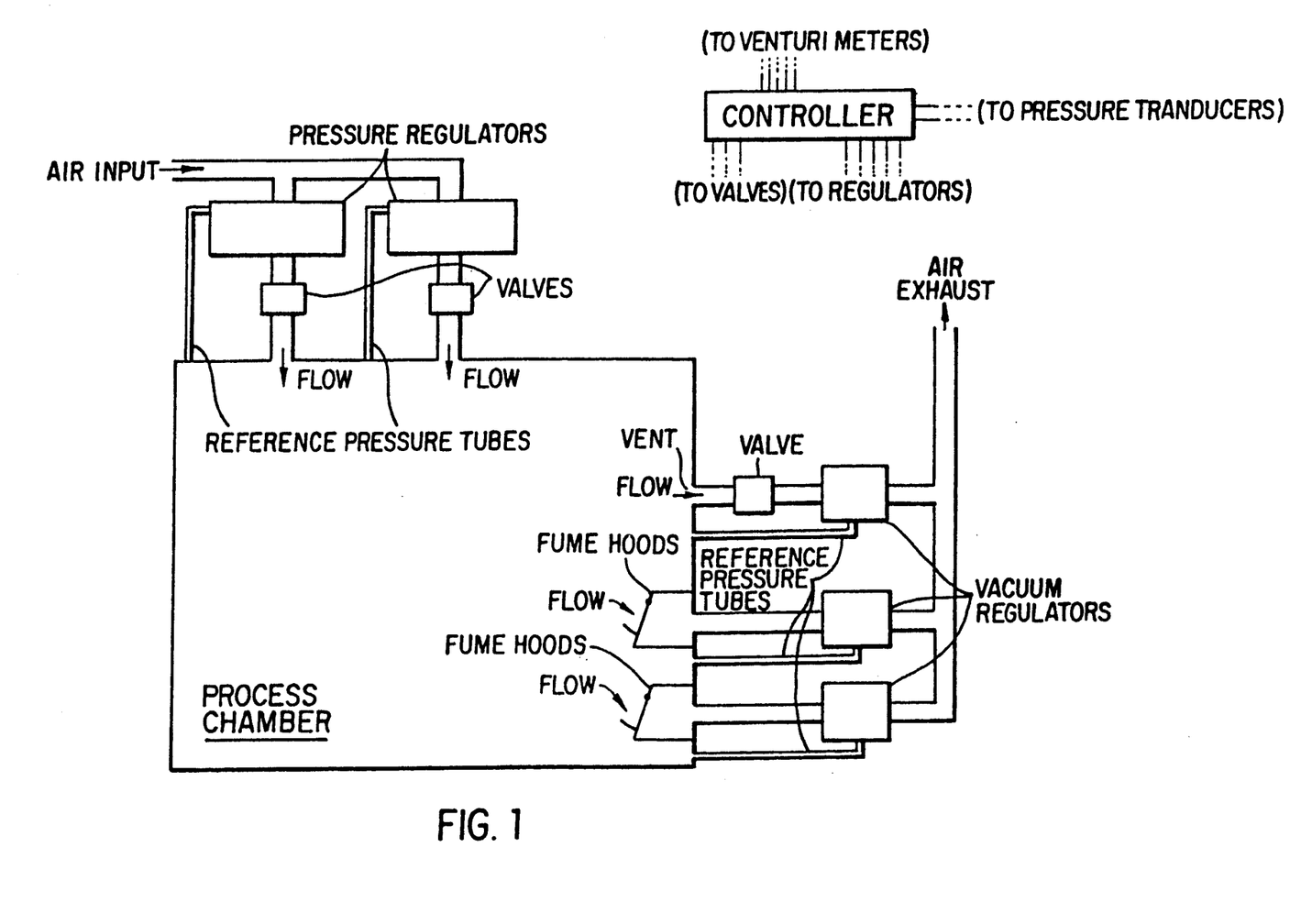
FIG. 1 shows how the flow into and out of a process chamber may be controlled.

FIG. 1 shows how the two-stage control system may be employed in order to control air flow into and out of a process. The air input is at a significantly higher pressure than the pressure in the process chamber and is prone to wide and rapid pressure variations. The flow from the air input branches out into several parallel conduits (two such conduits are shown in this figure) before reaching the process chamber. In each of these conduits is located a pressure regulator, which maintains in a plenum a pressure that is a constant amount greater than the pressure in the process chamber and that is, of course, less than the pressure at the air input. (As is discussed below with regard to FIGS. 2 and 3, these pressure regulators maintain a constant pressure in the plenum—with respect to the process chamber—by connecting to a piston a gate that variably impedes the flow between the air input and the plenum as the piston moves up and down. One side of the piston is exposed to the plenum, and its other side is exposed, through the reference pressure tube, to the pressure in the process chamber; thus, the piston can move in response to pressure fluctuations in the plenum and the environment. The piston may be mounted so that the pressure differential across the piston is counteracted by the weight of the piston, so as to establish a constant pressure differential across the piston.) Downstream from each of these regulators is located an adjustable valve, which impedes the flow between the plenum and the process chamber. These valves may be adjusted by a controller. As long as the pressure regulators maintain a constant pressure differential between the plenum and the process chamber, a constant flow rate is maintained for each setting of the adjustable valve.

Each conduit with a regulation stage and a valve stage operates independently of other conduits, in that if the flow through one conduit is interrupted or otherwise changes, the pressure in the plenum remains at a fairly constant amount above the process chamber's pressure (as long as the pressure at the air input remains high enough with respect to the process chamber), and thus the flow rate through a parallel conduit remains fairly constant. In other words, there is no cross-talk between regulators.

Air may exit the process chamber through a fume hood or directly through a vent. It is frequently desired to keep the pressure in the fume hoods at a constant pressure below that of the process chamber. To accomplish this, a vacuum regulator, which maintains in its plenum a partial vacuum with respect to the process chamber, is connected to each fume hood so as to apply a relatively small amount of impedance to the flow between the fume hood and the plenum. This low-impedance connection establishes a partial vacuum in the fume hood that is nearly equal to the partial vacuum maintained in the plenum and therefore is fairly constant with respect to the process chamber. When the door to the fume hood is opened, the regulator allows the flow rate through the fume hood to increase so as to maintain the partial vacuum. (The vacuum regulators are similar to the pressure regulators, in that, as is discussed below with regard to FIGS. 4 and 5, each vacuum regulator has a piston, the frontal face of which is exposed to air flowing through the plenum, and the distal face of which is exposed, through a reference pressure tube, to the pressure in the process chamber. The piston can move in response to pressure fluctuations in the plenum and the environment. The piston, as it moves up and down, variably impedes flow from the plenum to the vacuum source, i.e., the exhaust. The piston may be mounted so that the pressure differential across the piston is counteracted by the weight of the piston, so as to establish a constant pressure differential across the piston.)

To maintain a constant flow rate, as opposed to a constant partial vacuum, a valve is placed between the plenum and the process chamber to further impede flow, as is shown in the conduit leading from the vent in FIG. 1 (and in FIG. 5 of the Grandparent Application, U.S. Pat. No. 5,000,221). Likewise, if it is desired to establish a constant flow rate through a fume hood, a valve is placed between the fume hood and the vacuum regulator. An adjustable valve is used in order to vary the desired flow rate. The adjustable valve may be controlled by the controller.

Like the conduits leading into the process chamber, there is no cross-talk between the vacuum regulators in the conduits leading from the process chamber. Each conduit leading from the process chamber that has a regulation stage and a valve stage operates independently of other conduits, in that, if the flow through one conduit is interrupted or otherwise changes, the flow rate through a parallel conduit remains fairly constant (as long as the exhaust vacuum remains strong enough). Each conduit leading from the process chamber that has only a regulation stage (to maintain a constant partial vacuum in a fume hood) also operates independently of other conduits, in that, if the flow through one conduit is interrupted or otherwise changes, the vacuum in a fume hood connected to a parallel conduit remains fairly constant (as long as the exhaust vacuum remains strong enough).

A venturi meter, such as that shown in FIG. 2 (or even FIG. 1) in the concurrently filed application for Flow Control Valve With Venturi, may be disposed in each of the conduits leading to or from the process chamber, so as to provide flow rate information to the controller, which in turn may adjust the valves in the conduits. The controller may also recieve information from pressure tranducers regarding the pressure in the process chamber and the pressure outside the process chamber. By adjusting flow into and out of the process chamber, and monitoring the information from the pressure transducers inside and outside of the process chamber, the controller can ensure that the pressure in the process chamber remains above or below the outside pressure.

Figure 2:
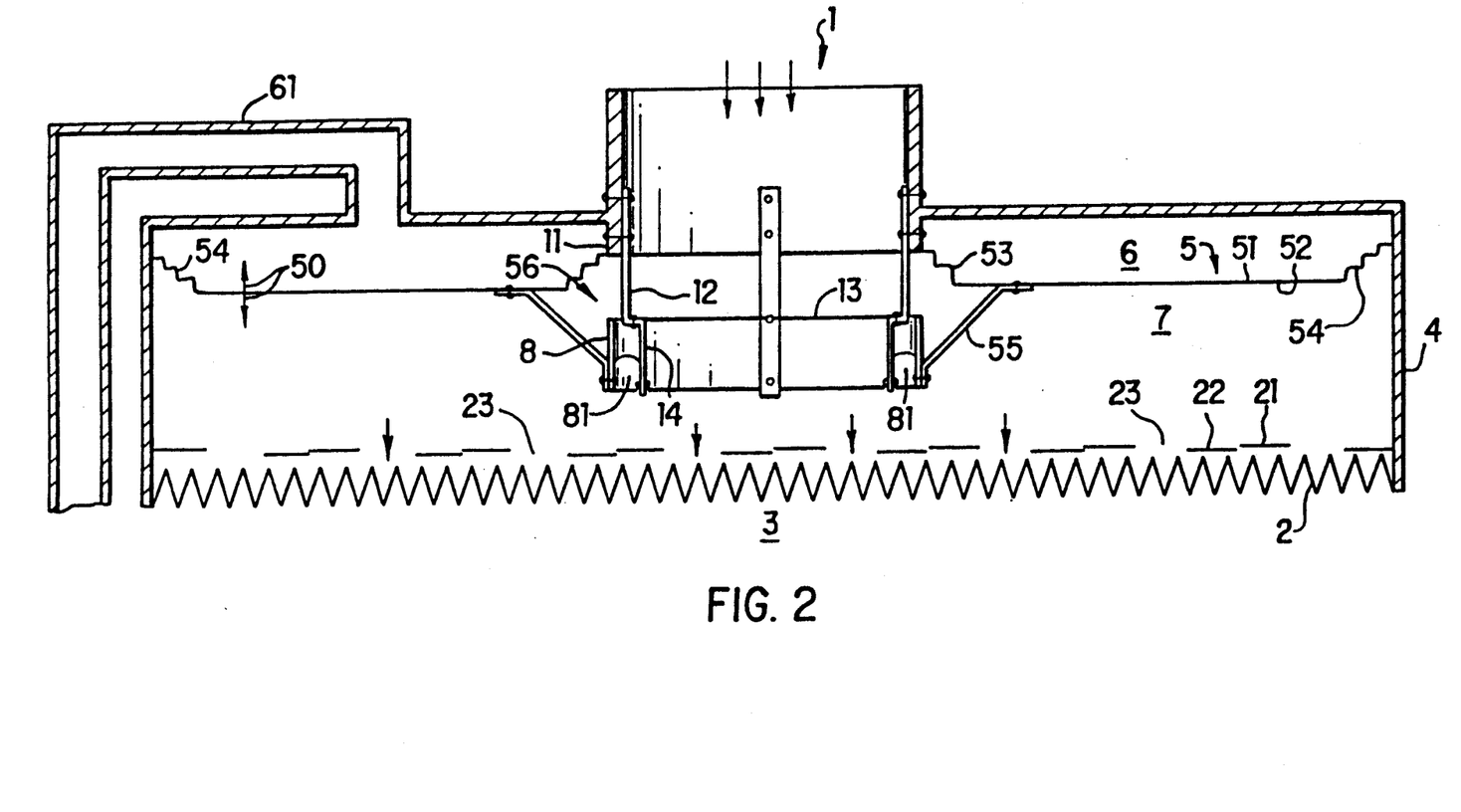
FIGS. 2 and 3 show devices for regulating the flow of air from a source to an environment.

FIG. 2 shows a device (also shown in FIG. 1 of the concurrently filed application for Flow Regulator Adaptable For Use With Process-Chamber Air Filter) containing a pressure regulator and an adjustable valve, wherein air flowing from a source, which provides air at a relatively high pressure, through an input 1 and a pleated filter 2 into a process chamber 3 (e.g., a clean room environment). The housing 4 is divided into two chambers, a chamber 6 and a plenum 7. The chamber 6 is at a reference pressure, and may be vented (by means of a tube 61 for example) to the clean room 3, so that the reference pressure in the chamber 6 is the same as the pressure of the clean room 3. The plenum 7 and the chamber 6 are separated by a movably mounted piston 5. One face of the piston 5, the frontal face 52, is exposed to the air in the plenum 7. The other face, the distal face 51 is exposed to the reference pressure in the chamber 6. The piston 5 may move in the directions indicated by the arrows 50. The piston 5 has a aperture 56 in its center. Air flowing from the input 1 passes through this aperture 56. The inner edge of the piston 5 is connected to the valve seat 11 by a membrane 53. The outer edge of the piston 5 may be connected to the housing 4 by a membrane 54. A deflector 13 may be connected to the valve seat 11 by struts 12. The deflector 13 redirects the flow of air from a direction that is parallel to the direction that the piston 5 may move, into axial directions that are transverse to the direction of movement of the piston 5. Connected to the piston 5 by struts 55 is an annular gate 8, which is located around the deflector 13 and which moves with the piston 5. In the preferred embodiment, the deflector 13 does not move. Rolling springs 81 may connect the gate 5 to struts 14 mounted on the bottom of the deflector 13. Although they are not not necessary, the rolling springs 81 may provide lateral stability to the piston 5 and help smooth the vertical motion of the piston 5. As the gate 8 moves with the piston 5, it variably restricts the flow of air through the device.

Air flowing through this device passes from the input 1, then is redirected by the deflector 13 past the gate 8, through the plenum 7, and then passes through the filter 2 into the clean room 3. How much the gate 8 impedes the air flow depends on the piston's 5 position, which in turn depends on the pressure difference between the plenum 7 and the chamber 6, and the restoring force working on the piston 5. In the device shown in FIG. 2, the restoring force is the combined weight of the piston 5, the gate 8 and the struts 55 connecting the two. This weight tends to open up the gate 8 and thereby lower the impedance to the flow that the gate causes. (By using the weight of the piston-strut-gate struture as the only restoring force, a constant restoring force is obtained. A constant restoring force is desirable for maintaining a constant pressure differential across the piston.) When the pressure in the plenum 7 becomes sufficiently greater than the pressure in the chamber 6, the piston 5 and the gate 8 rise and cause an increase in impedance on the flow by the gate 8. The increase in impedance by the gate 8 lowers the flow rate of the air. The piston 5 and gate 8 will come to a position of equilibrium, so as to cause a constant pressure differential between the plenum 7 and the chamber 6.

Thus, when the venting tube 61 is vented to the environment 3, the pressure in the plenum 7 is constant relative to the pressure in the environment 3. By maintaining a constant pressure drop across the filter 2 the device can maintain a fairly constant mass flow rate.

Without this device a drop in the clean room pressure would tend to cause the mass flow rate to increase, because there is a larger pressure drop between the source and the clean room 3. With the device, a drop in the clean room pressure causes the pressure in the chamber 6 to drop, because the chamber 6 is vented by tube 61 to the clean room. The drop in chamber pressure in turn causes the piston 5 and gate 8 to rise and increase the impedance on the air flow by the gate 8. This increase in impedance counteracts the larger pressure drop between the source and the clean room, so the mass flow rate remains fairly constant. Conversely, an increase in clean room pressure would tend to open up the gate s and lower the impedance.

Similarly, without this device an increase in pressure at the source would tend to cause an increase in the mass flow rate. With the device, an increase in pressure at the input 1 causes a momentary increase of pressure in the plenum 7, which in turn causes the piston 5 and gate 8 to move up. The rise in the gate s increases the impedance on the flow, thereby counteracting the larger pressure drop between the source and the clean room 3. Conversely, a drop in the input pressure would tend to open up the gate 8 and lower the impedance.

When there is little or no flow through the device, the gate 8 and piston 5 drop to their lowest position and provide the smallest impedance to the flow that the gate 8 can provide. Thus, when there is little or no flow, the device is fully open. The device does not have to be re-set after the flow has stopped. When the flow restarts and increases to a certain amount, the gate 8 and piston 5 rise to increase the impedance to the flow.

The device shown in FIG. 2 shows a preferred embodiment, wherein the gate is rigidly attached to the piston 5, so that the gate s and piston 5 move in unison. The piston and gate may also be attached by other means, such as levers or other types of mechanisms, so that, as the piston 5 rises, the gate 8 increases its impedance on the flow, and, as the piston drops, the gate lessens its impedance on the flow.

The filter 2 provides a constant resistance to the air flowing from the plenum 7 to the environment 3. Additional resistance can be provided by means of grids 21 and 22, which form orifices 23. Grid 21 is movable, so that the size of the orifices 23, and thus the resistance to flow from the plenum 7 to the environment 3, may be varied. The pressure in the plenum 7 relative to the environment 3 can be controlled by moving grid 21. The sliding of the movable grid 21 can be done by a stepper motor controlled by the controller. The orifices 23 may be of different sizes depending on their position within the device in order to disperse the air evenly through the filter.

Figure 3:
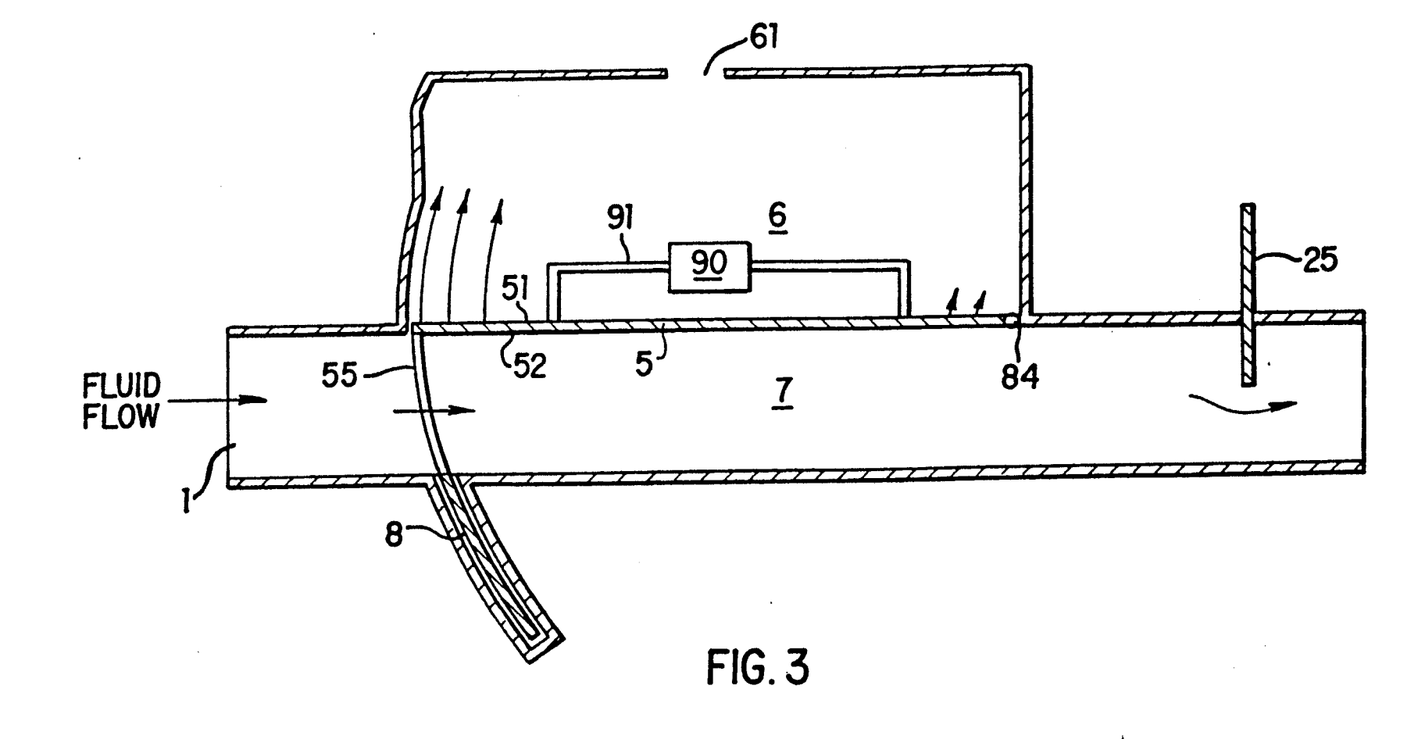

FIG. 3 shows an alternative to the FIG. 2 device, wherein the piston 5 is hingedly mounted. The piston 5 is connected to the gate 8 by means of struts 55. The piston 5 rotates up and down, so that it and the gate s move in a direction that is transverse to the direction of flow. The frontal face 52 of the piston 5 is exposed to air flowing through the conduit, and the piston's distal face 6 is exposed to a reference pressure chamber 6, which is preferably in fluid communication through a port 61 with an environment (e.g., a process chamber) downstream of the device. The input 1 of the device is connected to a source of air. Air flows past the struts 55 and the gate 8, and then past the piston 5. Downstream of the piston 5 is a gate valve 25, which may be moved up and down to alter the flow rate. The gate valve 25 in the FIG. 3 device performs the same function as the adjustable grid structure 21 and 22 of the FIG. 2 device. The piston 5 and the gate 8 in the FIG. 3 device are in their lowest position, which is consistent with a low flow rate. When the flow rate increases beyond a certain point (i.e., when the pressure differential between the piston's frontal and distal faces, 52 and 51, overcomes the weight of the piston-strut-gate structure, 5, 55 and 8—or other restoring force), the piston 5 pivots upward in the direction indicated by the arrows extending from the piston's distal face 51. The upward movement of the piston 5 causes the gate 8 to move upward to impede the flow. The gate 8 increases the impedance on the flow to counter any further increase in pressure at the input 1. Thus, the device is able to maintain a constant pressure differential between the plenum 7 and the chamber 6, the differential being related to the restoring force exerted on the piston, which in this case is the weight of the piston-strut-gate structure. By setting the pressure in the chamber 6 equal to the pressure downstream of the gate valve 25, a constant pressure drop across the gate valve 25 can be maintained. The position of the gate valve 25 can be adjusted to accurately control the flow rate. The restoring force created by the weight of the piston 5 can be modified by moving a slidable weight 90 along a rod 91, which may be accomplished by a stepper motor controlled by the controller.

Figure 4:
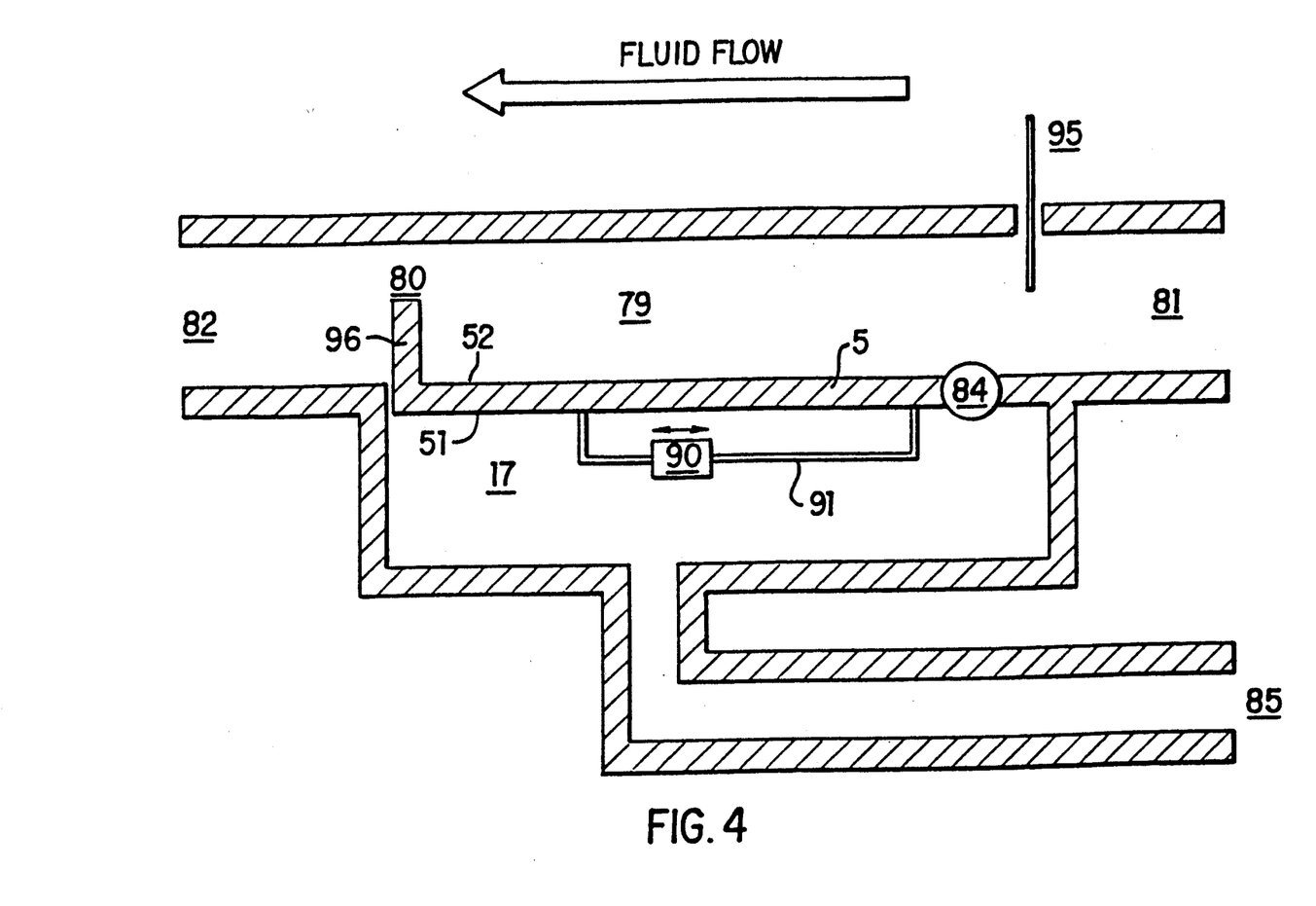
FIGS. 4 and 5 show devices for regulating the flow of air from an environment to an exhaust system.

FIG. 4 shows a mass flow regulator for controlling flow from the process chamber to an exhaust. Air flows from the input 81, past a variable resistor, which in this case is a gate valve 95, into a plenum 79. Air moves over the frontal face 52 of the piston 5. The air flow is then modulated by constriction point 80, which is formed by the upturned section 96 at the end of piston 5. The piston 5 rotates about hinge 84, so that member 96 moves in a direction transverse to the air flow. Preferably, the output 82 is connected to a vacuum source, but in any case the pressure at the output 82 must be lower than the pressure at the input 81.

The pressure in the plenum 79 is related to the fluid forces on the frontal and distal faces, 52 and 51, of the piston 5, and the restoring force on the piston 5. In the device shown in FIG. 4, the downward restoring force is the weight of the piston 5. Restoring force may also be supplied or modified by a spring, or, as shown in FIG. 4, by slidable weight 90, which may be moved along rod 91 by a stepper motor controlled by the controller. Thus, the restoring force acting on the pistons in the regulators shown in FIGS. 3 and 4 may be adjusted by the controller shown in FIG. 1. The restoring force tends to open the constriction point 80. The restoring force balances the force caused by the pressure differential between the plenum 79, which the air flows through, and the reference-pressure chamber 17 (which should have a higher pressure than the plenum 79 does), so that the piston 5 floats. One may alter the pressure differential between the plenum 79 and the chamber 17 by altering the restoring force on the piston 5, such as by using the slidable weight system shown. It is important that the vacuum at the output 82 be strong enough to cause the piston 5 to float; without a sufficiently strong vacuum the regulator will not be able to maintain a constant pressure in the plenum 79. With a sufficiently strong vacuum, the pressure in the plenum 79 will remain constant if the restoring force remains constant and the pressure in the chamber 17 remains constant. The chamber 17 is in fluid communication with the reference port 85, which is connected to the process chamber, from which air flows to the input 81.

If the pressure at the output 82 decreases, more air would tend to flow from the plenum 79 past the constriction point 80 to the output, which in turn would cause the pressure in the plenum 79 to drop, except a drop in the plenum pressure causes the piston 5 to rotate up and throttle the flow of air through the constriction point 80. Likewise, an increase in pressure at the output 82 causes the constriction point to widen. In this way, as long as there is a sufficient vacuum at the output 82 to compensate for the downward restoring force on the piston 5, the pressure in the plenum 79 remains a constant amount less than the reference pressure and independent of the pressure at the output.

Thus, the plenum 79 acts as a constant vacuum sink drawing in air flowing from input 81 past the gate valve 95, which acts as a resistor. If the differential pressure between input 81 and plenum 79 remains constant, and the resistance to flow between input 81 and plenum 79 remains constant, the air's mass flow rate will remain constant. The mass flow rate may be changed by changing the resistance to fluid flow caused by the gate valve 95. A constant pressure differential between the input 81 and the plenum 79 can be maintained by venting the reference chamber 17 to the input 81, which is accomplished by connecting reference port 85 to the input 81. Adjusting the gate valve 95 causes more or less fluid to flow into plenum 79, and the piston 5 and impeding member 96 will move down or up to modulate the pressure in the plenum 79. By connecting the reference port 85 to the input 81, a change in the input pressure will cause a corresponding change in the pressure of chamber 17, which in turn will cause the piston 5 to move and either widen or narrow the constriction point so to maintain a constant pressure differential between the plenum 79 and the input 81. By combining variable resistor 95 with a regulator that maintains a constant pressure differential across the variable resistor 95, the device shown in FIG. 4 performs very well as a mass flow controller.

The strength of the partial vacuum in the plenum 79 can be varied by adjusting the slidable weight 90. The regulator shown in FIG. 4 may be used to maintain a constant partial vacuum in a fume hood, if the gate valve 95 is eliminated or is set so as to impart very little impedance to the flow, if the input 81 is attached to the fume hoood, and if the reference tube 85 is connected to the environment outside of the fume hood.

The regulator shown in FIGS. 5 and 6 in the concurrently filed application for Flow Regulator Adaptable For Use With Exhaust From A Process Chamber, or the devices shown in FIGS. 1 and 2 of the Grandparent Application, U.S. Pat. No. 5,000,221, may also be used as a fume-hood vacuum regulator in FIG. 1 of the present application.

Figure 5:
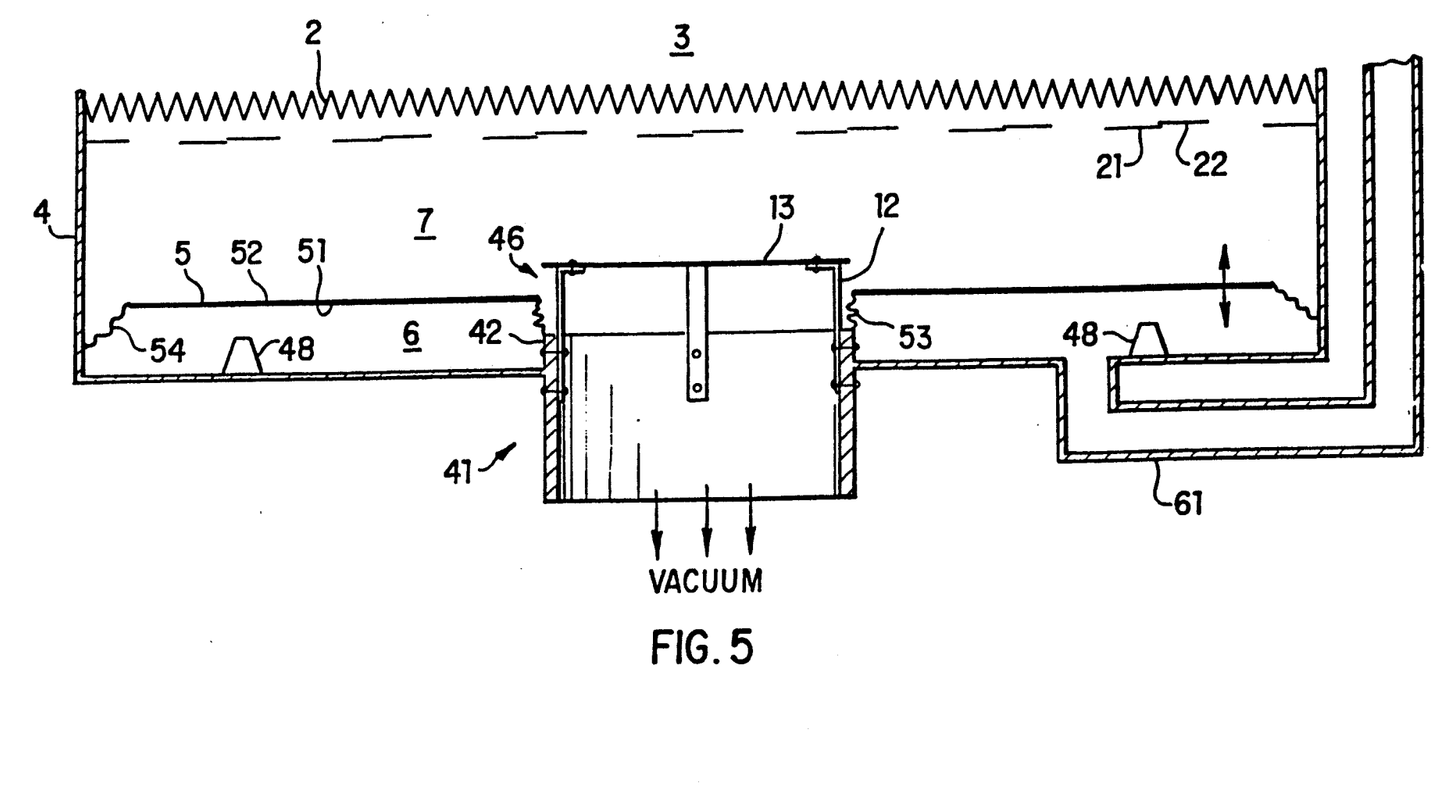

FIG. 5 shows a device that is somewhat similar in structure to the device shown in FIG. 2 above. However, it is connected to a vacuum source and is more similar in function to the device shown in FIG. 4 herein (or the devices shown in FIGS. 1 and 2 of the Grandparent Application, U.S. Pat. No. 5,000,221). In this device air passes from an environment 3, through a filter 2, then through the plenum 7 and an outlet 41 to a vacuum source.

The piston 5 has two faces, a frontal face 52 on the top of the piston 5, and a distal face 51 on the bottom of the piston 5. The piston 5 divides the interior of the housing into the plenum 7 and the reference chamber 6, which may be vented by means of tube 61 to the pressure in the environment 3. The outer edge of the piston 5 may be attached to the housing 4 by a membrane 54. The piston 5 has an aperture, through which the fluid may flow from the plenum 7 to the output 41. Membrane 53 may connect the edge of the piston's aperture to the valve seat 42. A barrier 13 is mounted over the output 41 by struts 12. The space between the barrier 13 and the valve seat 42 forms an evacuation port 46, that may be partially occluded as the piston 5 moves up and down. To prevent the piston 5 from settling on the bottom surface of the housing 4 the outer perimeter of the valve seat 42 may be wider than the piston's aperture, or alternatively stops 48 may be used.

The pressure in the plenum 7 is lower than the pressure in the environment 3; a pressure drop is caused by the flow through the filter 2. When the pressure in the plenum is sufficiently less than the pressure in the reference chamber 6, so as to overcome the weight of the piston 5, the piston will tend to float and occlude the evacuation port 46. The device is able to maintain a constant pressure differential between the plenum 7 and the reference chamber 6. For instance, if the pressure at the output 41 drops (i.e., the strength of the vacuum source increases), the pressure in the plenum 7 tends to drop as well; however, such a drop in the plenum pressure tends to lift up the piston 5, and thereby increase the impedance of the flow through the evacuation port 46.

This device can maintain a constant mass flow rate. By maintaining a constant pressure differential across the piston 5 and connecting the reference chamber 6 to the environment 3, one can maintain a constant pressure differential across the filter 2 and the grids, 21 and 22. If the resistance to the flow caused by the filter 2 and the grids, 21 and 22, is kept Constant, then a constant mass flow rate through the filter 2 is maintained. The flow rate may be adjusted by adjusting the resistance caused by the grids, 21 and 22, as discussed above in relation to the FIG. 2 device.

What is claimed is:

1. A system for controlling air flow between an environment and a pressure source having a pressure that differs substantially from the environment's pressure and that varies more quickly than the environment's pressure, the system comprising:

a regulator, having a plenum disposed in a conduit between the environment and the pressure source, for maintaining in the plenum a pressure that is between the pressures of the environment and the pressure source and that is a constant amount different from the environment's pressure, the conduit having a rigidly mounted wall, the regulator including a movably mounted member, which includes a piston having a frontal face exposed to air in the plenum flowing between the environment and the pressure source, the piston further having a distal face exposed to the environment's pressure, the piston defining an aperture through which air may flow between the plenum and the pressure source, the member being mounted with respect to a portion of the conduit wall so as to variably constrict the conduit between the member and the conduit wall and variably impede the flow of air through the regulator, so that the weight of the member tends to move the member in a direction so as to lessen the member's impedance on the air flow, and so that changes in the pressure source's strength does not affect the plenum pressure; and an adjustable valve, located between the regulator and the environment, for further impeding the flow of air.

2. A system according to claim 1, wherein the pressure source is a source of air at a higher pressure than the air in the environment, and wherein the member includes a gate attached to the piston for impeding the flow of air upstream of the plenum, and wherein the regulator maintains a pressure in the plenum that is a constant amount above the environment's pressure.

3. A system according to claim 2, wherein the gate is rigidly attached to the piston, so that the air flows between the gate and the piston.

4. A system for controlling air flowing through two parallel conduits from a source to an environment, where the air is substantially still, wherein the source's pressure is substantially greater than the environment's pressure, comprising:

a first regulator for maintaining in a first plenum disposed in the first conduit a pressure that is between the pressures of the environment and the source and that is a constant amount greater than the environment's pressure, the first regulator including a first member having a first gate and a first piston attached to the first gate, the first piston having a frontal face exposed to air in the first plenum, the first piston further having a distal face exposed to the environment's pressure, the first member being mounted so that the first gate variably impedes the flow of air through the first regulator, so that the weight of the first piston tends to move the first piston in a direction so as to lessen the first gate's impedance on the air flow, and so that the first plenum pressure is not affected by changes in the source's strength;

a first adjustable valve, located in the first conduit between the first regulator and the environment, for impeding the flow of air to the environment, so that a desired constant volume flow rate may be maintained through the first conduit, regardless of the second conduit's volume flow rate;

a second regulator for maintaining in a second plenum disposed in the second conduit a pressure that is between the pressures of the environment and the source and that is a constant amount greater than the environment's pressure, the second regulator including a second member having a second gate and a second piston attached to the second gate, the second piston having a frontal face exposed to air in the second plenum, the second piston further including a distal face exposed to the environment's pressure, the second member being mounted so that the second gate variably impedes the flow of air through the second regulator, so that the weight of the second piston tends to move the second piston in a direction so as to lessen the second gate's impedance on the air flow, and so that the second plenum pressure is not affected by changes in the source's strength; and a second adjustable valve, located in the second conduit between the second regulator and the environment, for impeding the flow of air to the environment, so that a desired constant volume flow rate may be maintained through the second conduit, regardless of the first conduit's volume flow rate.

5. A system according to claim 4, wherein the gates are rigidly attached to their respective pistons, so that the air in each conduit flows between the gate and the piston of the regulator disposed in that conduit.

* * * * *